United States Patent
Keavney et al.

(10) Patent No.: US 10,676,172 B1
(45) Date of Patent: Jun. 9, 2020

(54) DEPLOYABLE WING FOR AN AIRCRAFT

(71) Applicants: Thomas E. Keavney, Lakewood, CA (US); Robert E. Bauer, Union City, NJ (US)

(72) Inventors: Thomas E. Keavney, Lakewood, CA (US); Robert E. Bauer, Union City, NJ (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 308 days.

(21) Appl. No.: 15/958,421

(22) Filed: Apr. 20, 2018

(51) Int. Cl.
| | |
|---|---|
| *B64C 3/38* | (2006.01) |
| *B64C 3/54* | (2006.01) |
| *B64C 3/56* | (2006.01) |
| *B64C 3/30* | (2006.01) |
| *B64C 3/18* | (2006.01) |

(52) U.S. Cl.
CPC .............. *B64C 3/54* (2013.01); *B64C 3/187* (2013.01); *B64C 3/30* (2013.01); *B64C 3/56* (2013.01)

(58) Field of Classification Search
CPC ........ B64C 2201/102; B64C 2201/105; B64C 2031/065
See application file for complete search history.

(56) References Cited

U.S. PATENT DOCUMENTS

| | | | | |
|---|---|---|---|---|
| 2,602,614 A * | 7/1952 | Cole | ...................... | B64D 37/04 244/123.9 |
| 3,957,232 A * | 5/1976 | Sebrell | ...................... | B64C 3/30 244/123.11 |
| 4,725,021 A * | 2/1988 | Priddy | ...................... | B64C 3/30 244/123.11 |
| 4,858,854 A * | 8/1989 | Jacobson | .............. | B64C 31/028 244/123.11 |
| 5,244,169 A * | 9/1993 | Brown | .................. | B64D 17/025 244/123.11 |
| 6,082,667 A * | 7/2000 | Haggard | ................... | B64C 9/02 244/123.11 |
| 8,544,212 B2 * | 10/2013 | Brown | ...................... | B64C 3/30 244/123.11 |
| 2009/0199489 A1 * | 8/2009 | Brown | ...................... | B64C 3/30 52/2.11 |
| 2009/0206196 A1 * | 8/2009 | Parks | ........................ | B64C 3/56 244/49 |

* cited by examiner

*Primary Examiner* — Richard G Davis
(74) *Attorney, Agent, or Firm* — Tarolli, Sundheim, Covell & Tummino LLP (57) ABSTRACT

An apparatus for selectively increasing a wing area of an aircraft having a fuselage with an interior space includes an inflatable wing moveable between a stowed condition located in the interior space and a deployed condition located outside the interior space. The wing includes at least one inflatable spar. The inflatable spar is operatively coupled to a source of pressurized inflation fluid for selective inflation as the wing moves into the deployed condition. A plurality of reels is secured to the aircraft. A plurality of cables connects the wing to the reels. At least one reel is operable to unwind a selected cable to allow the wing to partially inflate to the deployed condition by ram air generated by movement of the aircraft as the inflatable spar is being inflated by the pressurized inflation fluid. A method for selectively increasing a wing area of an aircraft is also provided.

21 Claims, 8 Drawing Sheets

DEPLOYABLE WING FOR AN AIRCRAFT

TECHNICAL FIELD

This disclosure relates to an apparatus and method for use of a deployable wing for an aircraft and, more particularly, to a method and apparatus for selectively increasing a wing area of an aircraft having a fuselage with an interior space.

BACKGROUND

Current state-of-the-art high-speed aircraft may have difficulty operating at low speed, such as for takeoff, landing, and loitering. Greater wing area would facilitate selective low-speed operation of normally high-speed aircraft. However, there are many design trade-offs, such as a significant weight increase, needed to provide a high-speed aircraft with increased wing area using current design principles.

SUMMARY

In an embodiment, an apparatus for selectively increasing a wing area of an aircraft having a fuselage with an interior space is provided. The apparatus includes an inflatable wing moveable between a stowed condition located in the interior space and a deployed condition located outside the interior space. The wing includes at least one inflatable spar. The inflatable spar is operatively coupled to a source of pressurized inflation fluid for selective inflation as the wing moves into the deployed condition. A plurality of reels is secured to the aircraft. A plurality of cables connects the wing to the reels. The cables are spaced apart from one another in a fore-aft direction along the wing. At least one reel is operable to unwind a selected cable to allow the wing to partially inflate to the deployed condition by ram air generated by movement of the aircraft as the inflatable spar is being inflated by the pressurized inflation fluid to urge the wing toward the deployed condition.

In an embodiment, an aircraft is provided. An outer mold line is on a fuselage of the aircraft. An interior space is within the fuselage. An inflatable wing is moveable between a stowed condition, wherein the wing is substantially contained within the interior space and a deployed condition, wherein the inflatable wing is located substantially outside the outer mold line, in the ambient space. The inflatable wing includes substantially planar flexible upper and lower wing panels being attached together at an aft edge thereof and including space therebetween, when the wing is in the deployed condition, to form a wing interior. The wing interior is configured to accept, and thus become inflated by, ram air flow. At least one inflatable spar is operatively coupled to a source of pressurized inflation fluid for selective inflation as the wing moves into the deployed condition. The source of pressurized inflation fluid is substantially contained within the interior space. A plurality of reels is secured to the aircraft. A plurality of cables connect the wing to the reels. The cables are spaced apart from one another in a fore-aft direction along the wing. At least one reel is operable to unwind a selected cable to allow the wing to partially inflate to the deployed condition by ram air generated by movement of the aircraft as the inflatable spar is being inflated by the pressurized inflation fluid to urge the wing toward the deployed condition. At least one reel is selectively operable to retract a selected cable to control deflation of the wing and return of the wing into the stowed condition.

In an embodiment, a method of use for a deployable wing for an aircraft having a fuselage with an interior space is provided. An inflatable wing moveable between a stowed condition located in the interior space and a deployed condition located outside the interior space is provided. The wing includes an open fore edge, a wing interior, and at least one inflatable spar. The inflatable spar is operatively coupled to a source of pressurized inflation fluid for selective inflation as the wing moves into the deployed condition. The wing is secured to the aircraft at least by a plurality of cables connecting the wing to a plurality of reels secured to the aircraft. The cables are spaced apart from one another in a fore-aft direction along the wing. The wing is substantially contained within the interior space when the wing is in the stowed condition. The open fore edge of the wing is exposed to ram air generated by movement of the aircraft to allow the wing interior to inflate. The inflatable spar is inflated with the pressurized inflation fluid. The wing is urged toward the deployed condition.

BRIEF DESCRIPTION OF THE DRAWINGS

For a better understanding, reference may be made to the accompanying drawings, in which.

DESCRIPTION OF ASPECTS OF THE DISCLOSURE

This technology comprises, consists of, or consists essentially of the following features, in any combination.

Figure 1:
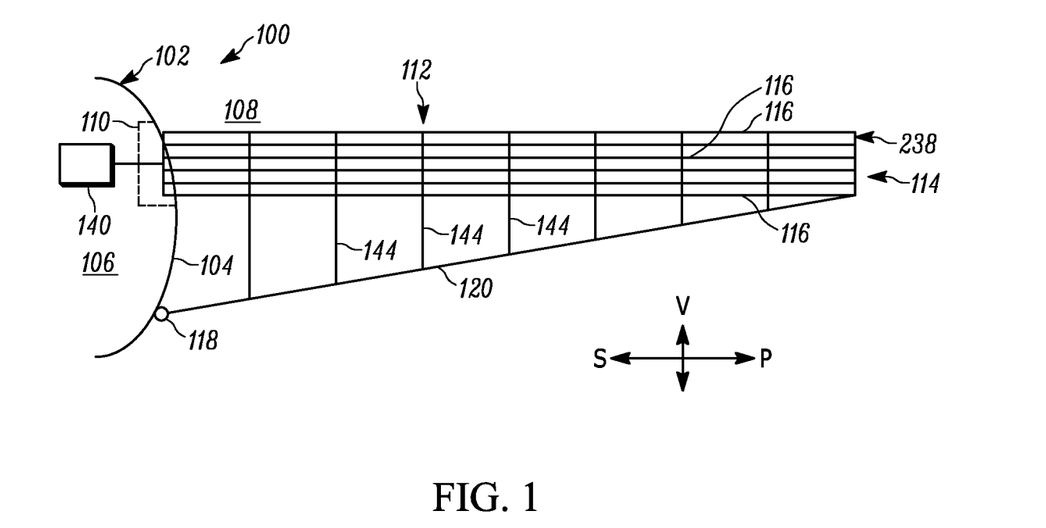
FIG. 1 is a schematic partial front view of an aircraft incorporating one aspect of the invention, in a deployed configuration.

FIG. 1 schematically depicts a portion of an aircraft 100. A fuselage 102 of the aircraft 100 has an outer mold line 104. An interior space 106 of the aircraft 100 may be separated from ambient space 108 by an aperture 110 in the outer mold line 104. An apparatus 112 is provided for selectively increasing a wing area of the aircraft 100. The apparatus 112 includes an inflatable wing 114 selectively moveable between a stowed condition (shown in FIG. 4) where the wing 114 is located in the interior space 106 and a deployed condition (shown in FIG. 1) where the wing 114 is located outside the interior space 106. For example, the wing 114 could be substantially contained within the interior space 106 in the stowed condition and located wholly outside the outer mold line 104, in the ambient space 108, in the deployed condition. While a fuselage 102 is used herein as an example "platform" from which the apparatus 112 is operated, the apparatus 112 could also or instead be associated with, and deployed/stowed in relation to, any other desired portion of the aircraft 100 (e.g., a wingtip pod, not shown) or any other air- or water-traveling vehicle for a particular use environment.

The wing 114 includes at least one inflatable spar 116. The inflatable spar 116 is operatively coupled to a source of pressurized inflation fluid (e.g., a scuba tank of compressed air) for selective inflation as the wing 114 moves from the stowed condition into the deployed condition shown in FIG. 1. A plurality of inflatable spars 116 may be provided to an inflatable wing 114. When present, each of the plurality of inflatable spars 116 extends in a starboard-port direction and the inflatable spars 116 are mutually spaced apart from one another in a fore-aft direction, as shown in the Figures, to assist with support of the inflatable wing 114 as shown and described herein. (The "starboard-port" and "fore-aft" directions are used herein for convenience to indicate a line or axis generally, in either a positive or negative direction unless otherwise indicated. That is, these general signifiers of direction should not be taken to imply that action must run only from the starboard side to the port side or the fore end to the aft end, unless explicitly or implicitly indicated.)

A plurality of reels 118 is secured to the aircraft 100. A plurality of cables 120 connects the wing 114 to the reels 118. The cables 120 are spaced apart from one another in a fore-aft direction along the wing 114. At least one reel 118 is operable to unwind a selected cable 120 (e.g., the cable 120 attached to that reel 118) to allow the wing 114 to partially inflate to the deployed condition by ram air generated by movement of the aircraft 100 as the inflatable spar 116 is being inflated by the pressurized inflation fluid to urge the wing 114 toward the deployed condition.

The reels 118 may be secured to the aircraft 100 in any suitable manner, such as by being bolted or otherwise fastened to a structural member of the aircraft 100. The term "reel" is used herein primarily to indicate a revolvable device on which something flexible (described herein as a cable 120 for some aspects of the apparatus 112, as discussed in detail below) is wound, but the term "reel" should also be considered to encompass any other device or mechanism, whether or not revolvable which is capable of selectively changing an effective length of a cable 120. For example, a "reel", as used herein, would encompass, but not be limited to, a windlass, block and tackle, linear actuator, or any other line retraction/extension aid. The terms "wind" and "unwind" are used herein to reference, respectively, decreasing and increasing an effective length of the suspension lines, regardless of whether rotary motion is involved. The reels 118 may be configured for selective operation to selectively change a physical configuration of the wing 114 during transition of the wing 114 between the stowed and deployed conditions, as will be discussed below.

The inflatable wing 114 may include at least one substantially planar flexible upper wing panel 322 and at least one substantially planar flexible lower wing panel 324 (one of each being presumed in the below description). The wing 114, or structures thereof—such as the upper and lower wing panels 322 and 324—could be made of any desired material including, but not limited to, fabric or any other flexible sheet material, whether or not fabric-reinforced. For example, the upper and lower wing panels 322 and 324 could be made substantially from a flexible fabric material, and will be described herein as such. Aft portions of the upper and lower wing panels 322 and 324 are attached together at an aft edge 326 of the wing 114, which is substantially closed. This attachment, as well as other attachments of the flexible sheet materials discussed herein could be accomplished in any desired manner such as, but not limited to, sewing, heat welding, and adhesive bonding.

Each of the upper and lower wing panels 322 and 324 may be significantly longer in a starboard-port direction ("span", shown by arrow S-P in the Figures) than in a fore-aft direction ("chord", shown by arrow F-A in the Figures), but may have any desired aspect ratio for a particular use environment. While the wing 114 is depicted herein as being a rectangular wing (a relatively simple configuration), seen in plan view, any desired wing 114 shape could be provided by one of ordinary skill in the art, such as, but not limited to, a non-rectangular wing shape (e.g. elliptical).

Figure 3:
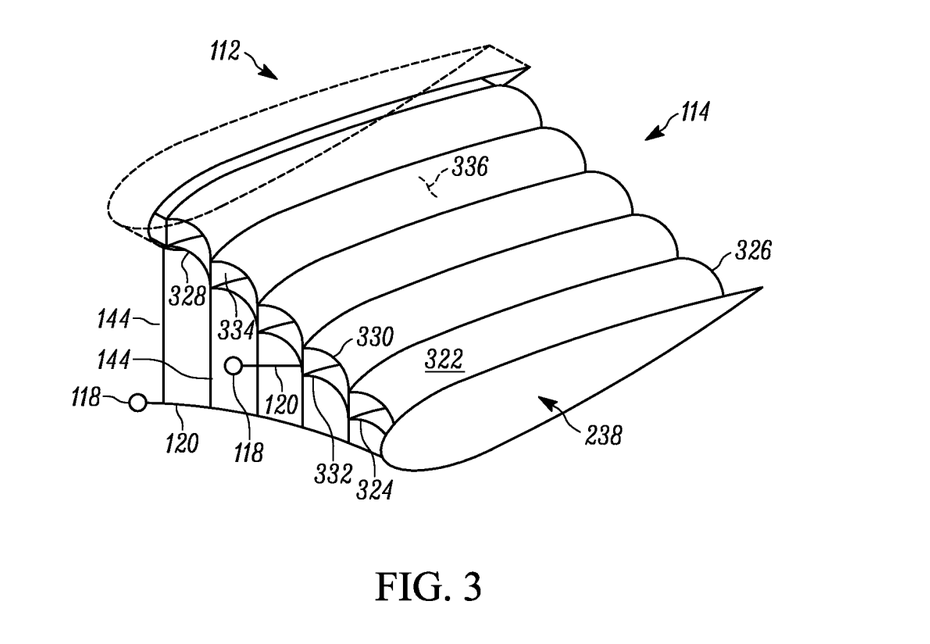
FIG. 3 is a perspective top view of the aspect of FIG. 1 in the deployed configuration.

The upper and lower wing panels 322 and 324 include space therebetween, when the wing 114 is in the deployed condition as shown at least in FIGS. 1 and 3. This space could be vertically between the upper and lower wing panels 322 and 324—i.e., in a direction parallel to line "V" shown in the Figures. (The term "vertical" is used herein as a relative, not absolute, direction.) The spacing between the upper and lower wing panels 322 and 324 could be interposed in any desired orientation, depending on the relative positioning of those upper and lower wing panels 322 and 324 for a particular use environment. This is true of any orientations or directions referenced throughout this application; one of ordinary skill in the art will be able to transpose the relative locations and structures as needed when the wing 114 extends in a direction other than the substantially horizontal orientation of the Figures.

The upper and lower wing panels 322 and 324 thus cooperate to form a wing interior 328 which is substantially closed at the aft edge 326 of the wing, with the fore portions 330 and 332, respectively, of the upper and lower wing panels 322 and 324 being spaced apart when the wing 114 is in the deployed condition. The wing interior 328 is configured to accept, and thus become at least partially inflated into the deployed condition by, ram air flow generated by movement of the aircraft. The upper and lower wing panels 322 and 324 could be attached together across the entirety of the aft edge 326 of the wing 114, or there could be one or more gaps between the upper and lower wing panels 322 and 324 at the aft edge 326 for any desired purpose, including allowing selective ram air flow out of the wing interior through the aft edge 326, and/or to facilitate deflation of the wing 114 during retraction and stowage. The upper and lower wing panels 322 and 324 may be configured to selectively slide along at least one of the cables (as described below) in a starboard-port direction during deployment and stowing of the wing 114.

At least one flexible interior baffle 334 may extend vertically between, and substantially perpendicular to, the upper and lower wing panels 322 and 324. Each interior baffle 334, when present, may be substantially oriented in a fore-aft direction to partition the wing interior 328 into a plurality of interior compartments 336 spaced apart from one another in the starboard-port direction. The interior baffles 334 may help to maintain vertical spacing along the starboard-port and/or fore-aft expanses of the upper and lower wing panels 322 and 324.

Figure 2:
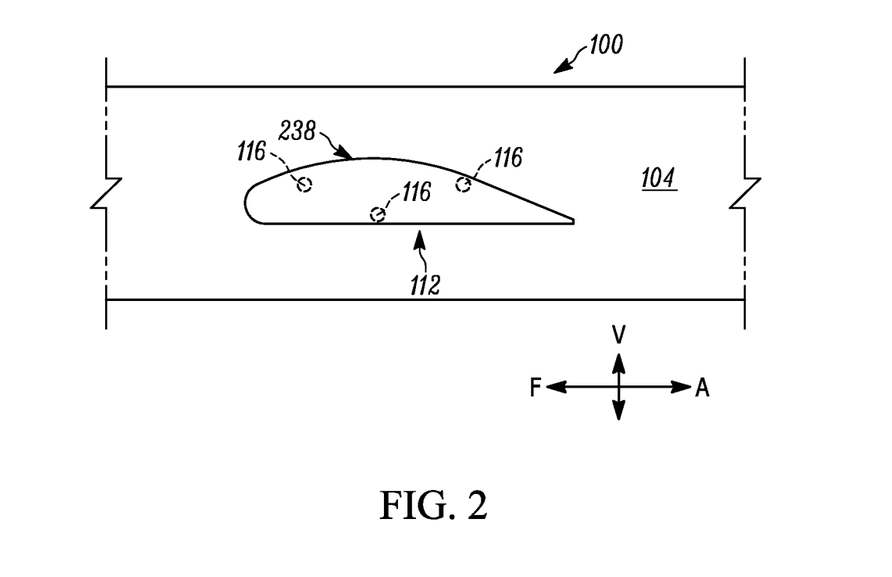
FIG. 2 is a partial side view of the aspect of FIG. 1.
Figure 4:
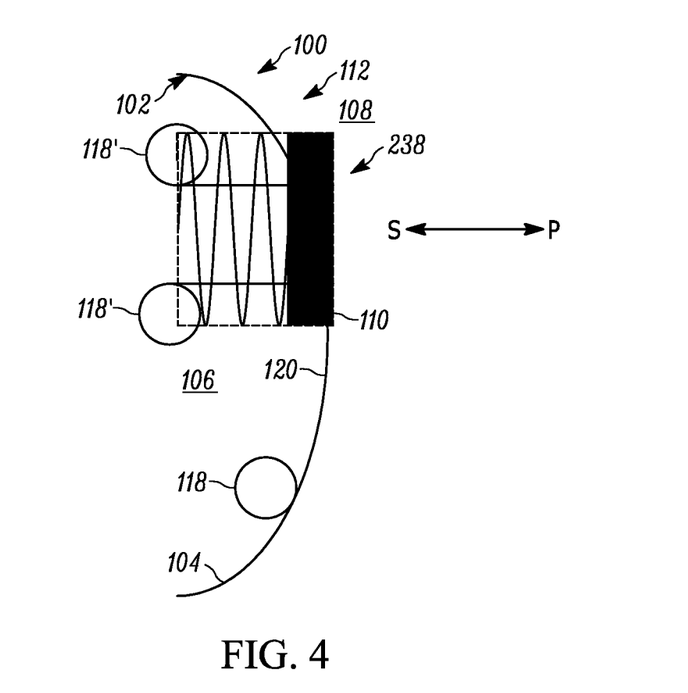
FIG. 4 is a schematic partial front view of the aircraft of FIG. 1 with the aspect of FIG. 1 in a stowed configuration.
Figure 5:
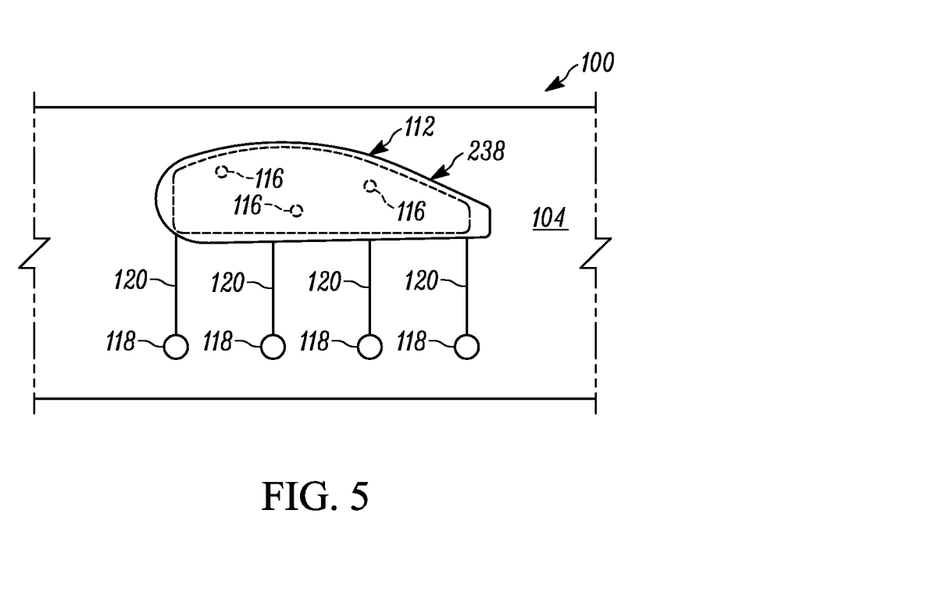
FIG. 5 is a partial side view of the aspect of FIG. 4.
Figure 6:
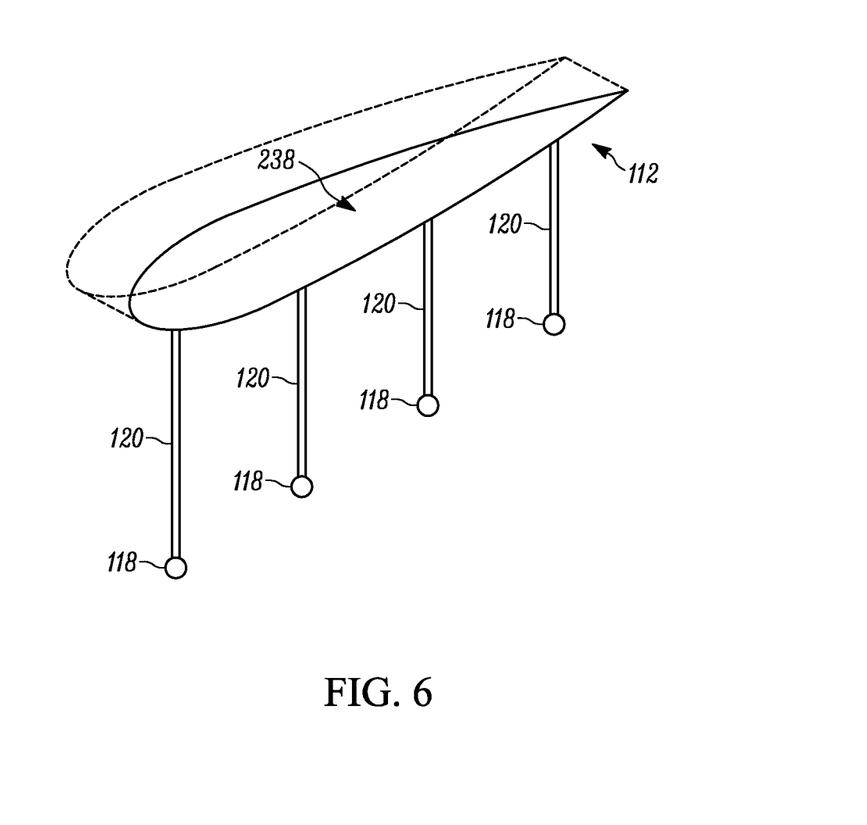
FIG. 6 is a perspective top view of the aspect of FIG. 4.
Figure 7:
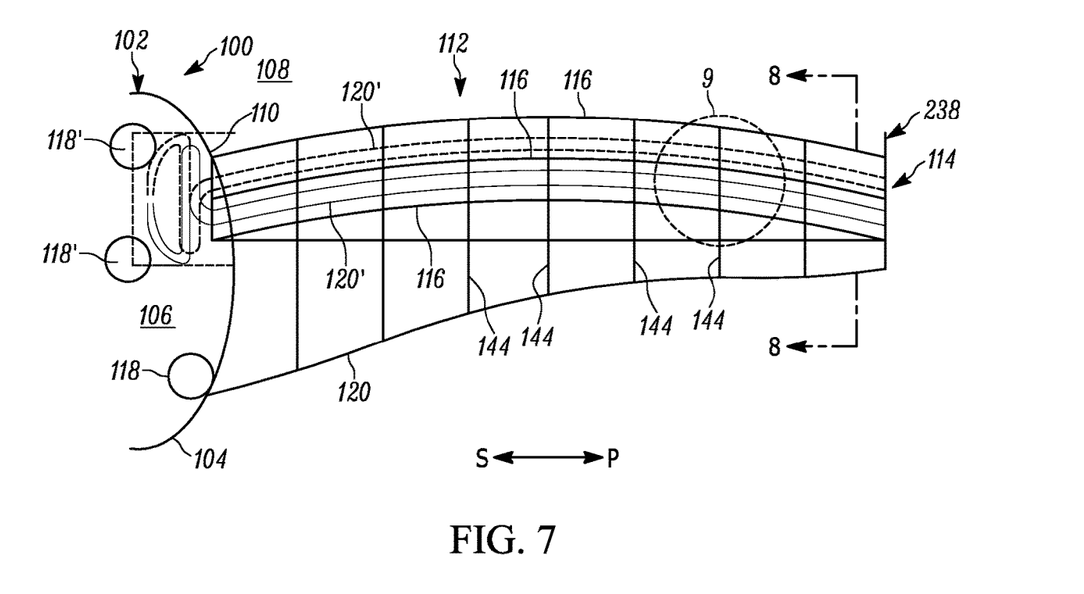
FIG. 7 is a schematic partial front view of the aircraft of FIG. 1 with the aspect of FIG. 1 in a partially deployed configuration.

As shown in at least FIGS. 1-3 a substantially rigid end rib 238 may be located at an opposite end of the inflatable wing 114 from the fuselage 102. When present, the end rib 238 may at least partially enclose the interior space 106 when the inflatable wing is in the stowed condition as shown in FIGS. 4-6. The end rib 238, when present, is attached to at least one reel 118 by at least one cable 120. The end rib 238 moves back and forth along a starboard-port direction as the inflatable wing 114 is moved between deployed and stowed positions. As just alluded to, the end rib 238 itself may perform a covering function for the aperture 110 when the apparatus 112 is stowed within the interior space 106, though it is contemplated that a separate cover (not shown) may cover all or part of the aperture 100 during such a stowed phase of operation.

The rigging of the various cables and lines of the apparatus 100 is shown at least in FIGS. 1, 3, 5-6, 8, and 10. The cables and lines shown and described herein could have any desired configuration, be attached to the reel(s) 118 and the wing 114 in any desired manner, and be made of any desired material(s), such as, but not limited to, nylon and Spectra®, available from Honeywell International, Inc. of Morris Plains, N.J. The lines and cables can be made of any flexible cord, cable, rope, or the like, but should be strong, sufficiently stiff to function as described, flexible, and resistant to vertical stretching for most use environments of the apparatus 112. While a substantially horizontally extending wing is shown in the Figures and described below, it is contemplated that there could be cables, reels 118, and other rigging above the wing 114, as well (e.g., if a negative angle of attack is desired. It is also contemplated that the wing 114 could extend vertically, or at any desired angle between horizontal and vertical, for a particular use environment, with corresponding cables, reels 118, and other rigging attached in any desired manner (e.g., on one or both sides of the wing 114) in accordance with the principles disclosed herein. For example, the wing 114 could be a vertical fin (not shown), which may help with providing low speed yaw stability and/or control.

The cables 120 each extend between the end rib 238 (or other "outboard" end of the apparatus 112) and a reel 118 attached to the fuselage 102 in a spaced relationship with the aperture 110. Though the reels 118 attached to the cables 120 are shown as being located below the aperture 110 on the fuselage 102, any suitable location for the reels 118 could be chosen for a particular use environment. The cables 120 are selectively unwound and wound, respectively, by their corresponding reels 118 to allow the end rib 238 to travel away from and toward, respectively, the fuselage 102 during deployment and stowing of the inflatable wing 114. Accordingly, the cables 120 may anchor and steady the inflatable wing 114 in a manner similar to a guy-line.

As mentioned above, at least one inflatable spar 116 may be operatively coupled to a source of pressurized inflation fluid (shown schematically at 140) for selective inflation as the inflatable wing 114 moves into the deployed condition and selective deflation as the inflatable wing 114 moves into the stowed condition. The source of pressurized inflation fluid 140 may be substantially contained within the interior space 106 and may be of any desired type including, but not limited to, a compressed-air or other compressed-fluid tank, a fluid pump, a fluid manifold, or any combination thereof. Each inflatable spar 116 may have any suitable cross-section, but is contemplated to have cross-sectional dimensions which are a superminority of the length of the spar 116, in order to achieve an elongated rod-like configuration when inflated. The inflation pressure of each inflatable spar 116 may be selected by one of ordinary skill in the art to provide desired inflated rigidity for a particular use environment, and may vary from spar 116 to spar 116 within a single apparatus 112.

With reference to at least FIGS. 2, 5, 8, 10, 12, and 14, at least one inflatable spar 116 may be connected, at an outboard end thereof, to the end rib 238 when present (or another outboard terminus of the inflatable wing 114). An inboard end of the inflatable spar 116 may be anchored within the interior space 106 of the aircraft 100 or otherwise secured, directly or indirectly, to the fuselage 102. Each inflatable spar 116 may extend in a starboard-port direction through at least one baffle 334 and/or at least one of the upper and lower wing panels 322 and 324, such as by extending through a grommet 842 in at least one of those "sheet" structures. For many use environments, one or more of the inflatable spar(s) 116 can extend through, but not be affixed to, at least one baffle 334 and/or at least one of the upper and lower wing panels 322 and 324 so that those "sheet" structures can slide along the inflatable spar(s) 116 during deployment and stowage. This will result in an operational configuration similar to that of a Roman blind or Roman shade for a window, with the material of the at least one baffle 334 and/or at least one of the upper and lower wing panels 322 and 324 being gathered up in a controlled manner as the inflatable spar(s) are deflated, for stowage within the interior space 106 during deflation of the inflatable wing 114. The inflatable spar(s) can be compacted onto a reel (not shown) or otherwise effectively shortened in length in order to assist stowage.

It is contemplated that one or more cables 120' could extend substantially parallel to the inflatable wing 114, in addition to or as opposed to extending at the angle shown by the remote-reel 118 arrangement in the Figures. This arrangement is shown schematically in at least FIGS. 7-8 and 11-12. Any such "parallel" cable 120' could be wound and unwound selectively by a reel 118' located within the interior space 106, in conjunction with the deployment and stowing of the inflatable wing 114. A "parallel" cable 120' will function similarly to the inflatable spars 116 of the apparatus 112, as described above, acting in a manner much like that of a Roman shade. That is, the parallel cable 120' may extend through, but not be affixed to, at least one baffle 334 and/or at least one of the upper and lower wing panels 322 and 324 so that those "sheet" structures can selectively slide along the parallel cable 120' during deployment and stowage, as the parallel cable 120' is unwound and wound, respectively, from the corresponding reel 118'.

It is contemplated that some combination of cables 120 and 120' could be wound and unwound from their corresponding reels 118 and 118' to control a position of the end rib 238, at least in the starboard-port direction, with respect to the fuselage 102 of the aircraft 100. As the end rib 238 moves outboard from the fuselage 102, at least one inflatable spar 116 may be selectively inflated (via the source of pressurized inflation fluid 140) in coordination with the deployment to stiffen the inflatable wing 114 and resist uncontrolled movement of the end rib 238. The interior compartments 336 will start to inflate under ram air pressure during the deployment process, and will also help to lend some relative stiffness and structure to the inflatable wing 114 to move the wing 114 toward the position shown in FIG. 1.

In order to further control the wing 114 position during deployment, use, and stowage, a plurality of suspension lines 144 may extend vertically between the wing 114 and a corresponding cable 120 located vertically below the wing. When present, each suspension line 144 may be connected to the wing 114 at a location spaced from the other suspension lines 144, and each suspension line 144 may be configured to resist vertical motion of the wing 114 in conjunction with the corresponding cable 120 located vertically below the wing 120. The plurality of suspension lines 144 each may be slidably connected to the corresponding cable 120 located vertically below the wing, in order to move in a "shower curtain" type manner along the cable 120 during deployment and stowage of the inflatable wing 114, or may be affixed to the cable 120. The lengths of each of the suspension lines 144 could be selected to allow for a desired vertical spacing between the inflatable wing 114, as deployed, and the "guy wire" cable 120 below the wing 114. As a result, vertical motion of the inflatable wing 114 is constrained along its starboard-port length by the suspension lines 144, to assist with deployment, use, and stowage of the inflatable wing 114.

In summary, the apparatus 112 includes a plurality of cables 120, 120' connecting the wing 114 to the reels 118, 118'. The cables 120, 120' are spaced apart from one another in a fore-aft direction along the wing 114. At least one reel 118, 118' is operable to unwind a selected and corresponding cable 120, 120' to allow the wing 114 to partially inflate to the deployed condition by ram air generated by movement of the aircraft 100, concurrently with the inflatable spar 116 being inflated by the pressurized inflation fluid to urge the wing 114 toward the deployed condition. At least one reel 118, 118' is selectively operable to retract a selected and corresponding cable 120, 120' to control deflation of the wing 114 and return of the wing 114 into the stowed condition.

The sequence of FIGS. 4-6, 7-10, and 11-14 schematically illustrate a method of use (also described in the flowchart of FIG. 15) for a deployable wing 114 for an aircraft 100 having a fuselage 102 with an interior space 106. In FIGS. 4-6, 7-10, and 11-14, as in all of the Figures, element number labels were intentionally omitted from certain duplicative structures for clarity, though one of ordinary skill in the art will be able to extrapolate and analogize which unnumbered structures are similar to those numbered. There is no particular meaning or significance intended by which of a plurality of structures of a certain type are numbered and which are left unnumbered.

Figure 15:
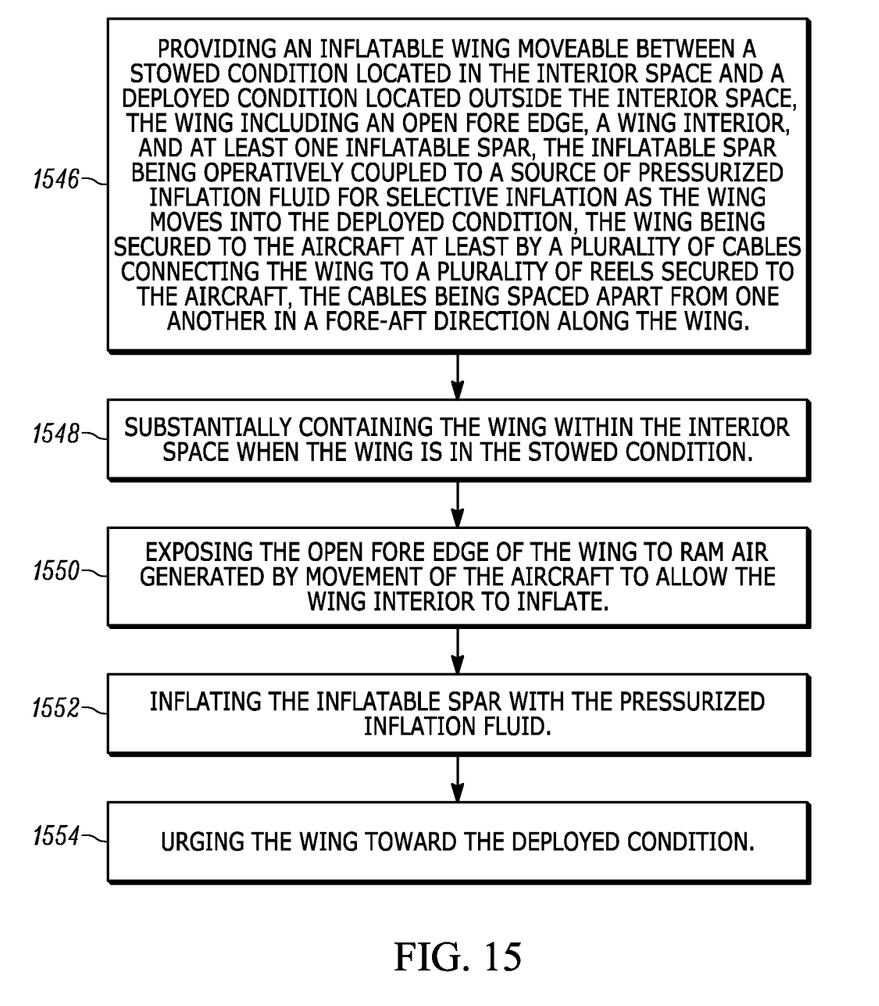
FIG. 15 is a flowchart illustrating an example sequence of use of the aspect of FIG. 1.

In the first action block 1546 of FIG. 15, an apparatus 112 as described above is provided. An inflatable wing 114 includes an open fore edge, a wing interior, and at least one inflatable spar 116. The inflatable spar 116 is operatively coupled to a source of pressurized inflation fluid for selective inflation as the wing 114 moves into the deployed condition. The wing 114 is secured to the aircraft 100 at least by a plurality of cables 120, 120' connecting the wing 114 to a plurality of reels 118, 118' secured to the aircraft, the cables 120, 120' being spaced apart from one another in a fore-aft direction along the wing 114.

In second action block 1548 of FIG. 15, the wing 114 is substantially contained within the interior space 106 when the wing 114 is in the stowed condition. This arrangement is shown in FIGS. 4-6. Here, the end rib 238 is serving as a cover in the outer mold line 104 to "cap" the aperture 110.

Figure 8:
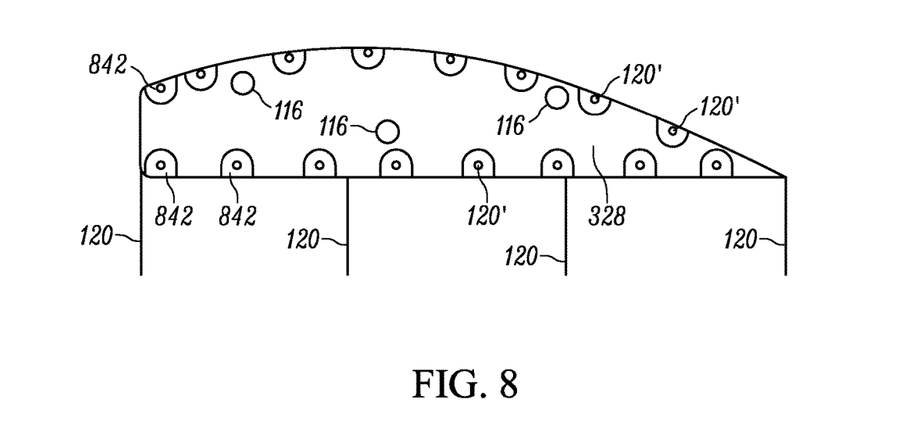
FIG. 8 is a cross-sectional view taken along line 8-8 of FIG. 7.
Figure 9:
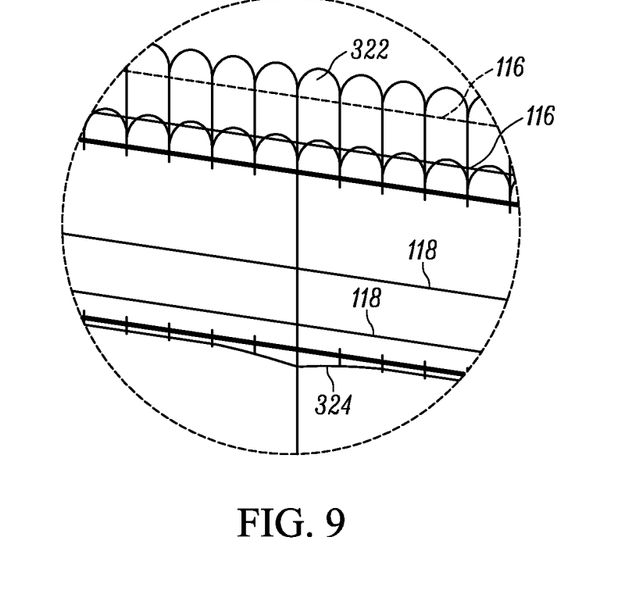
FIG. 9 is a detail view of area "9" of FIG. 7.
Figure 10:
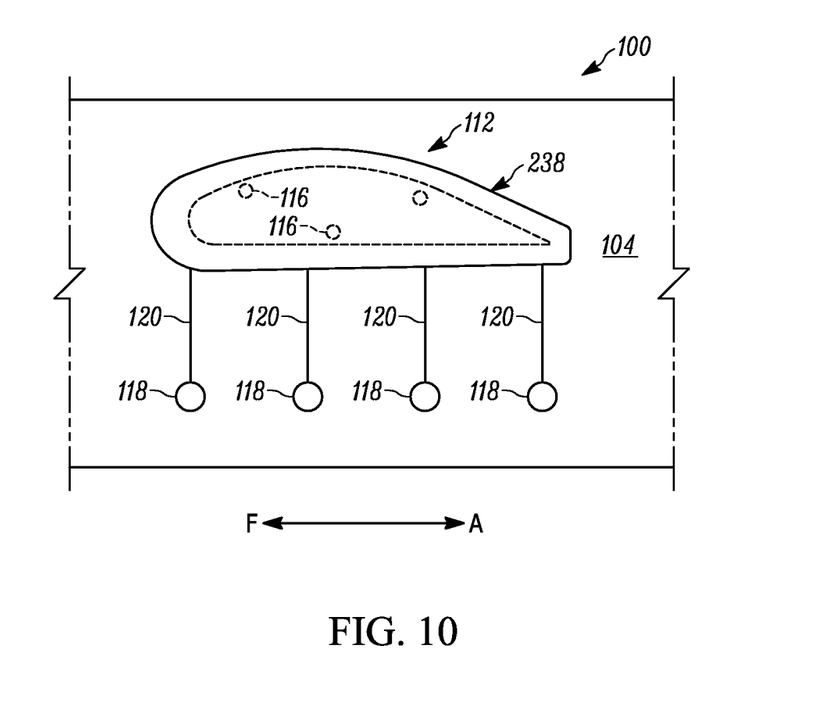
FIG. 10 is a partial side view of the aspect of FIG. 7.
Figure 11:
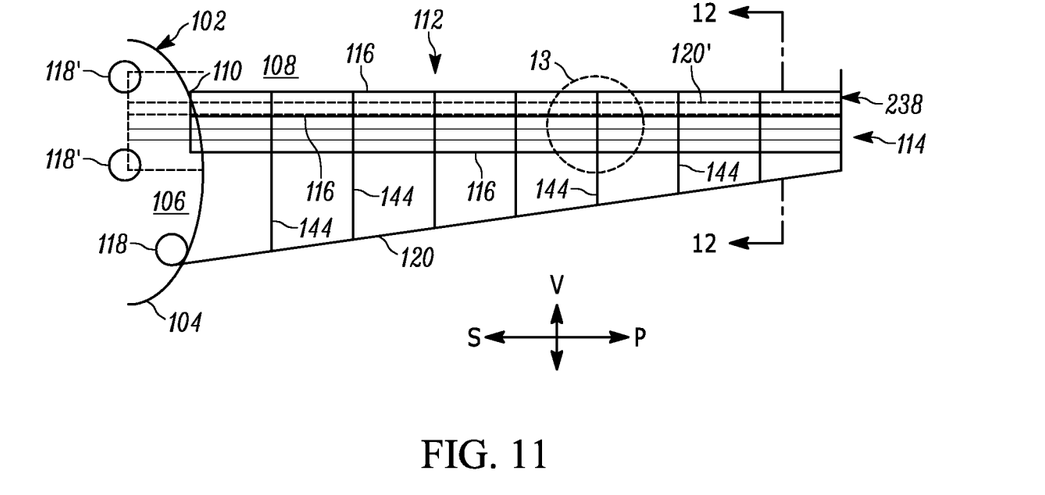
FIG. 11 is a schematic partial front view of the aircraft of FIG. 1 with the aspect of FIG. 1 in a deployed configuration.
Figure 12:
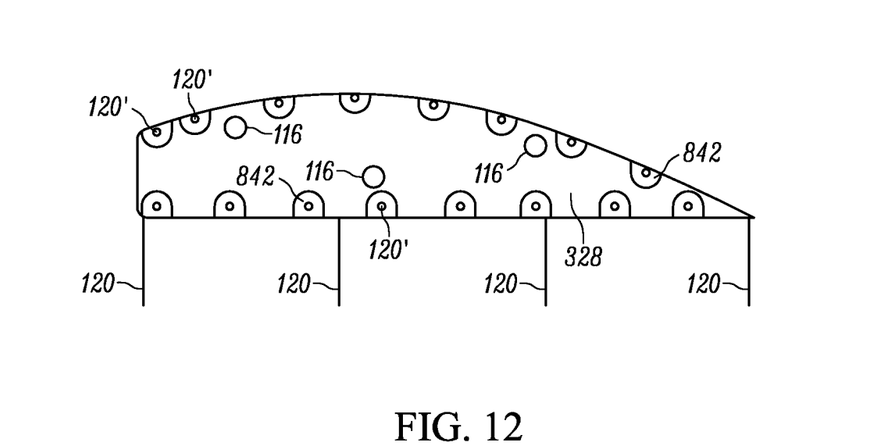
FIG. 12 is a cross-sectional view taken along line 12-12 of FIG. 11.
Figure 13:
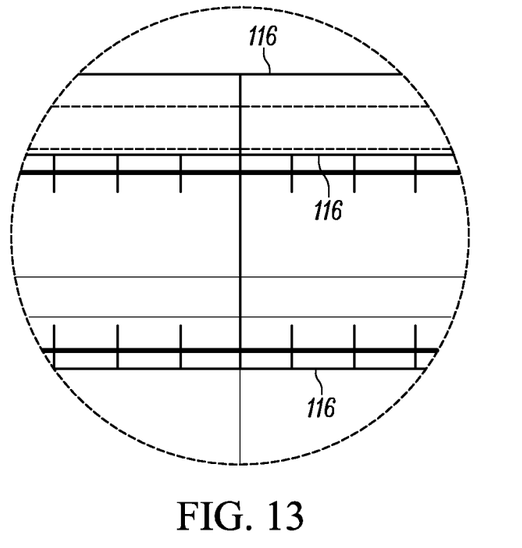
FIG. 13 is a detail view of area "13" of FIG. 11.
Figure 14:
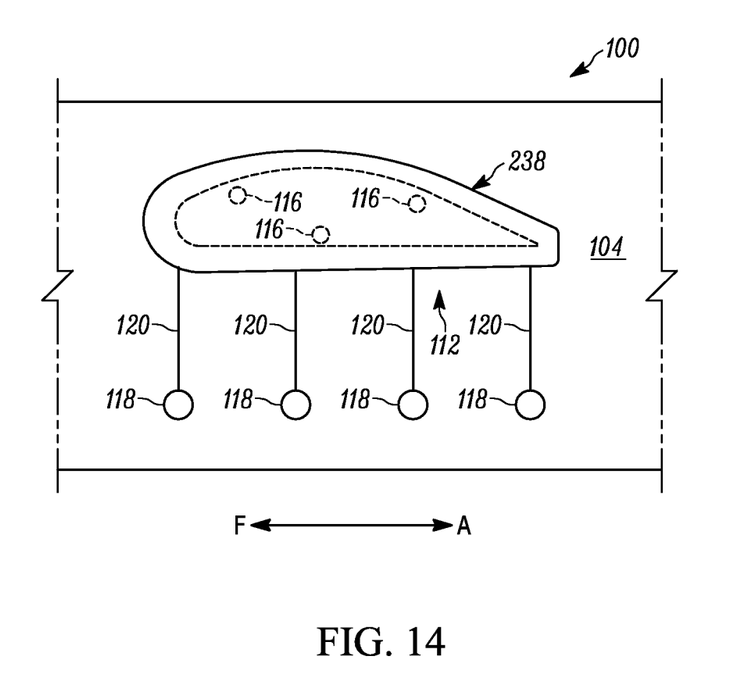
FIG. 14 is a partial side view of the aspect of FIG. 11.

In third action block 1550 of FIG. 15, the open fore edge of the wing 114 is exposed to ram air generated by movement of the aircraft 100 to allow the wing interior to inflate, as shown in FIGS. 8-10. This exposure of the wing 114 to ram air can be accomplished by operating at least a chosen one of the reels 118, 118' to extend the cable attached to the chosen reel 120, 120' and thereby release the end rib 238, when present, from the fuselage 102 or otherwise assist with release of an outboard end of the wing 114 from the interior space 106. (It is contemplated that one or more latches or other fasteners, not shown, could be provided in order to avoid unwanted release of the end rib 238 from the fuselage 102.) The ram air will then "catch" the inflatable wing 114 and start to stiffen and form the deployed structure. However, as shown in FIGS. 8-10, the wing 114 may be bowed or otherwise in an intermediate position or configuration during deployment.

In fourth action block 1552, the inflatable spar 116 is inflated with the pressurized inflation fluid, to actuate the inflatable spar(s) 116. This actuation of the inflatable spars 116 may occur in conjunction with the exposure of the wing 114 to ram air, in order to provide some structure to the wing 114 while inflating and thus provide some measure of control to the deployment.

In fifth action block 1554, the wing 114 is urged toward the deployed condition. For example, this urging can occur via one or both of the actuation of the inflatable spars 116 and the exposure of the open fore edge of the wing 114 to ram air.

As the apparatus 112 completes the deployment sequence partially described in the FIG. 15 flowchart, the "soft" or "sheet" structures of the wing 114 can be shaped and urged by the reel/cable combinations, inflatable spars 116, and/or suspension lines 144 to achieve the fully deployed use configuration as shown in FIGS. 11-14. For example, during deployment, the upper and lower wing panels 322 and 324 can be selectively slid along at least one of the cables 120, 120' in a starboard-port direction, as can at least one of the plurality of suspension lines 144. Any desired mechanical, hydraulic, pneumatic, electronic, electric, or other control system(s) and/or controller(s) can be used to manually or automatically regulate the deployment and stowage of the apparatus 112 in a particular use environment.

In FIGS. 11-14, the wing 114 has reached a fully deployed condition, with the wing interior (e.g., interior compartments 336) inflated by ram air flow as desired and the inflatable spars 116 inflated by pressurized air. The apparatus 112 can now be used to provide on-demand additional wing surface area to the aircraft 100 as desired. For example, the apparatus 112 may assist with low-speed operation (e.g., takeoff, landing, loitering) of a high-speed aircraft, while avoiding the weight, expense, and other design complications of a fixed/rigid wing, even one which is selectively deployable. The reels 118, 118' may be operated as desired, manually and/or automatically, to change a shape of the wing 114, an attitude of the wing 114, a distance of any structure of the wing 114 from the outer mold line 104, or any other traits as appropriate to produce a desired aerodynamic result.

When it is no longer desirable for the wing 114 to assist with flight, the apparatus 112 can be operated to return the wing 114 from the deployed position to the stowed position. This occurs, in most cases, by substantially reversing the deployment sequence described above. The wing 114 material is "gathered in" (such as in a Roman shade or Roman blind type manner) and the wing interior of the wing 114 in the deployed condition is deflated by selectively operating at least one reel 118, 118' to retract a selected cable 120, 120' Concurrently or sequentially, at least one inflatable spar 116 may be deflated by removal of pressurized inflation fluid therefrom, as quickly as desired, to help guide and control the stowage process.

As shown in FIGS. 4-6, reels 118, 118' may be actuated to retract the cables 120, 120' attached thereto and thus draw the wing 114 fully back into the interior space 106, to return the wing 114 from the deployed condition into the stowed condition in the interior space 106 of the aircraft 100. Upon completion of the stowage procedure, the apparatus 112 will once again be in the fully stowed condition as depicted in FIGS. 4-6, and, when present, the end rib 238 can be placed across the aperture 110 and maintained there to restore the smooth contour of the outer mold line 104 of the aircraft 100.

It is contemplated that one or more of the interior baffles 334 may be extended below the lower wing panel 324 to provide a desired aerodynamic effect such as, but not limited to, tip vortex reduction and/or yaw stability.

While aspects of this disclosure have been particularly shown and described with reference to the example embodiments above, it will be understood by those of ordinary skill in the art that various additional embodiments may be contemplated. For example, the specific methods described above for using the apparatus are merely illustrative; one of ordinary skill in the art could readily determine any number of tools, sequences of steps, or other means/options for placing the above-described apparatus, or components thereof, into positions substantively similar to those shown and described herein. Any of the described structures and components could be integrally formed as a single unitary or monolithic piece or made up of separate sub-components, with either of these formations involving any suitable stock or bespoke components and/or any suitable material or combinations of materials. Any of the described structures and components could be disposable or reusable as desired for a particular use environment. Any component could be provided with a user-perceptible marking to indicate a material, configuration, at least one dimension, or the like pertaining to that component, the user-perceptible marking aiding a user in selecting one component from an array of similar components for a particular use environment. A "predetermined" status may be determined at any time before the structures being manipulated actually reach that status, the "predetermination" being made as late as immediately before the structure achieves the predetermined status. Though certain components described herein are shown as having specific geometric shapes, all structures of this disclosure may have any suitable shapes, sizes, configurations, relative relationships, cross sectional areas, or any other physical characteristics as desirable for a particular application. Any structures or features described with reference to one embodiment or configuration could be provided, singly or in combination with other structures or features, to any other embodiment or configuration, as it would be impractical to describe each of the embodiments and configurations discussed herein as having all of the options discussed with respect to all of the other embodiments and configurations. A device or method incorporating any of these features should be understood to fall under the scope of this disclosure as determined based upon the claims below and any equivalents thereof.

Other aspects, objects, and advantages can be obtained from a study of the drawings, the disclosure, and the appended claims.

We claim:

1. An apparatus for selectively increasing a wing area of an aircraft having a fuselage with an interior space, the apparatus comprising:
   an inflatable wing moveable between a stowed condition located in the interior space and a deployed condition located outside the interior space, the wing including at least one inflatable spar, the inflatable spar being operatively coupled to a source of pressurized inflation fluid for selective inflation as the wing moves into the deployed condition;
   a plurality of reels secured to the aircraft;
   a plurality of cables connecting the wing to the reels, the cables being spaced apart from one another in a fore-aft direction along the wing, at least one reel being operable to unwind a selected cable to allow the wing to partially inflate to the deployed condition by ram air generated by movement of the aircraft as the inflatable spar is being inflated by the pressurized inflation fluid to urge the wing toward the deployed condition.

2. The apparatus of claim 1, including a substantially rigid end rib located at a opposite end of the inflatable wing from the fuselage, the end rib at least partially enclosing the interior space when the inflatable wing is in the stowed condition, and the end rib being attached to at least one reel by at least one cable.

3. The apparatus of claim 1, wherein the wing includes flexible upper and lower wing panels, each of the upper and lower wing panels being significantly longer in a starboard-port direction than in a fore-aft direction, the upper and lower wing panels being attached together at the aft portions thereof with the fore portions of the upper and lower wing panels being spaced apart, when the wing is in a fully deployed condition, to admit ram air into a wing interior space defined by the upper and lower wing panels, and the upper and lower wing panels being configured to selectively slide along at least one of the cables in a starboard-port direction during deployment and stowing of the wing.

4. The apparatus of claim 3, including at least one flexible interior baffle extending vertically between the upper and lower wing panels and substantially perpendicular thereto, each interior baffle being substantially oriented in a fore-aft direction to partition the wing interior into a plurality of interior compartments spaced apart in the starboard-port direction.

5. The apparatus of claim 1, including a plurality of inflatable spars extending in a starboard-port direction and being mutually spaced apart in a fore-aft direction.

6. The apparatus of claim 1, wherein the wing is made substantially from a flexible sheet material.

7. The apparatus of claim 1, including a plurality of suspension lines extending vertically between the wing and a corresponding cable located vertically below the wing, each suspension line being connected to the wing at a location spaced from the other suspension lines, each suspension line being configured to resist vertical motion of the wing with the corresponding cable located vertically below the wing.

8. The apparatus of claim 7, wherein the plurality of suspension lines are slidably connected to the corresponding cable located vertically below the wing.

9. An aircraft comprising:
   an outer mold line on a fuselage of the aircraft;
   an interior space within the fuselage;
   an inflatable wing moveable between a stowed condition, wherein the wing is substantially contained within the interior space and a deployed condition, wherein the inflatable wing is located substantially outside the outer mold line, in the ambient space, the inflatable wing including:
      substantially planar flexible upper and lower wing panels being attached together at an aft edge thereof and including space therebetween, when the wing is in the deployed condition, to form a wing interior configured to accept, and thus become inflated by, ram air flow, and
      at least one inflatable spar operatively coupled to a source of pressurized inflation fluid for selective inflation as the wing moves into the deployed condition, the source of pressurized inflation fluid being substantially contained within the interior space;

a plurality of reels secured to the aircraft; and a plurality of cables connecting the wing to the reels, the cables being spaced apart from one another in a fore-aft direction along the wing, at least one reel being operable to unwind a selected cable to allow the wing to partially inflate to the deployed condition by ram air generated by movement of the aircraft as the inflatable spar is being inflated by the pressurized inflation fluid to urge the wing toward the deployed condition, and at least one reel being selectively operable to retract a selected cable to control deflation of the wing and return of the wing into the stowed condition.

10. The aircraft of claim 9, including a substantially rigid end rib located at a opposite end of the inflatable wing from the fuselage, the end rib at least partially enclosing the interior space when the inflatable wing is in the stowed condition, and the end rib being attached to at least one reel by at least one cable.

11. The aircraft of claim 9, wherein each of the upper and lower wing panels is significantly longer in a starboard-port direction than in a fore-aft direction, and the upper and lower wing panels are configured to selectively slide along at least one of the cables in a starboard-port direction during deployment and stowing of the wing.

12. The aircraft of claim 11, including at least one flexible interior baffle extending vertically between the upper and lower wing panels and substantially perpendicular thereto, each interior baffle being substantially oriented in a fore-aft direction to partition the wing interior into a plurality of interior compartments spaced apart in the starboard-port direction.

13. The aircraft of claim 9, including a plurality of inflatable spars extending in a starboard-port direction and being mutually spaced apart in a fore-aft direction.

14. The aircraft of claim 9, including a plurality of suspension lines extending vertically between the wing and a corresponding cable located vertically below the wing, each suspension line being connected to the wing at a location spaced from the other suspension lines, each suspension line being configured to resist vertical motion of the wing with the corresponding cable located vertically below the wing.

15. The apparatus of claim 14, wherein the plurality of suspension lines are slidably connected to the corresponding cable located vertically below the wing.

16. A method of use for a deployable wing for an aircraft having a fuselage with an interior space, the method comprising:

providing an inflatable wing moveable between a stowed condition located in the interior space and a deployed condition located outside the interior space, the wing including an open fore edge, a wing interior, and at least one inflatable spar, the inflatable spar being operatively coupled to a source of pressurized inflation fluid for selective inflation as the wing moves into the deployed condition, the wing being secured to the aircraft at least by a plurality of cables connecting the wing to a plurality of reels secured to the aircraft, the cables being spaced apart from one another in a fore-aft direction along the wing;

substantially containing the wing within the interior space when the wing is in the stowed condition;

exposing the open fore edge of the wing to ram air generated by movement of the aircraft to allow the wing interior to inflate;

inflating the inflatable spar with the pressurized inflation fluid; and urging the wing toward the deployed condition.

17. The method of claim 16, wherein exposing the open fore edge of the wing to ram air generated by movement of the aircraft to allow the wing interior to inflate with the ram air includes operating at least a chosen one of the reels to extend the cable attached to the chosen reel.

18. The method of claim 16, including:

providing a substantially rigid end rib located at a opposite end of the inflatable wing from the fuselage;

at least partially enclosing the interior space with the end rib when the inflatable wing is in the stowed condition; and attaching the end rib to at least one reel by at least one cable.

19. The method of claim 16, including:

selectively deploying or stowing the wing by operating at least a chosen one of the reels to extend or retract the cable attached to the chosen reel; and selectively sliding the upper and lower wing panels along at least one of the cables in a starboard-port direction during deployment and stowing of the wing.

20. The method of claim 16, including:

providing a plurality of suspension lines extending vertically between the wing and a corresponding cable located vertically below the wing;

connecting each suspension line to the wing at a location spaced from the other suspension lines; and resisting vertical motion of the wing via interaction of the plurality of suspension lines with the corresponding cable located vertically below the wing.

21. The method of claim 16, including:

deflating the wing interior of the wing in the deployed condition by selectively operating at least one reel to retract a selected cable;

deflating at least one inflatable spar in the deployed condition by removing pressurized inflation fluid therefrom; and returning the wing from the deployed condition to the stowed condition in the interior space of the aircraft.

* * * * *